United States Patent
Tyber et al.

(10) Patent No.: US 10,088,836 B2
(45) Date of Patent: Oct. 2, 2018

(54) METHODS, SYSTEMS, AND APPARATUS FOR RESOURCE ALLOCATION IN A MANUFACTURING ENVIRONMENT

(71) Applicant: General Electric Company, Schenectady, NY (US)

(72) Inventors: Steven Jay Tyber, Rexford, NY (US); Shanshan Wang, Rexford, NY (US); Peter Leigh Katlic, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 313 days.

(21) Appl. No.: 14/812,760

(22) Filed: Jul. 29, 2015

(65) Prior Publication Data
US 2017/0031354 A1 Feb. 2, 2017

(51) Int. Cl.
G05B 19/418 (2006.01)

(52) U.S. Cl.
CPC ......... *G05B 19/41865* (2013.01); *G05B 2219/32301* (2013.01); *Y02P 90/18* (2015.11); *Y02P 90/20* (2015.11); *Y02P 90/26* (2015.11)

(58) Field of Classification Search
CPC .......... G05B 19/41885; G05B 2219/32017
See application file for complete search history.

(56) References Cited

U.S. PATENT DOCUMENTS

| | | | |
|---|---|---|---|
| 5,495,417 A * | 2/1996 | Fuduka | G05B 13/042 700/121 |
| 6,691,068 B1 * | 2/2004 | Freed | G05B 19/41865 702/187 |
| 7,558,638 B2 * | 7/2009 | Chang | G05B 19/4184 700/100 |
| 8,407,077 B2 | 3/2013 | Hindi et al. | |
| 8,428,990 B2 | 4/2013 | Moll et al. | |
| 8,554,704 B2 | 10/2013 | Lipets et al. | |
| 2005/0071035 A1 * | 3/2005 | Strang | G05B 19/41885 700/121 |
| 2006/0052984 A1 * | 3/2006 | Nakadate | G06F 17/50 702/182 |
| 2007/0005266 A1 * | 1/2007 | Blevins | G05B 17/02 702/22 |
| 2009/0204234 A1 * | 8/2009 | Sustaeta | G05B 13/024 700/29 |
| 2011/0202382 A1 | 8/2011 | Santos et al. | |

(Continued)

OTHER PUBLICATIONS

Tecnomatix Plant Simulation, 2014, www.siemens.com/tecnomatix.*

*Primary Examiner* — Mark Connolly
(74) *Attorney, Agent, or Firm* — Fitch Even Tabin & Flannery LLP

(57) ABSTRACT

Methods, systems, computer program products, and articles of manufacture for managing a manufacturing environment are described. An optimized schedule for operators is generated based on an optimization data structure, the optimization data structure comprising one or more manufacturing objectives and one or more resource constraints. The manufacturing activity is simulated based on the generated optimized schedule and an initial state data structure, the initial state data structure comprising a representation of an initial state of the manufacturing environment. The simulation results are analyzed to, for example, determine if the manufacturing objectives are satisfied.

20 Claims, 14 Drawing Sheets

(56) References Cited

U.S. PATENT DOCUMENTS

2016/0179081 A1* 6/2016 Sun ................... G05B 19/4069
700/97
2016/0274553 A1* 9/2016 Strohmenger ... G05B 19/41885

* cited by examiner

| Index | Inventory & Machine Data | Optimization | Simulation | Data Review |

Inventory & Machine Data

General

Time since last firing [ 0 ] Hours — 704
Widget Inventory [ 1000 ] Units — 708
Estimated Hourly Demand [ 125 ] Units — 712
Base Hour [ 0 ] — 716

Inventory  LAST UPDATED 11/16/2014 8:00 — 720

| Description | Current Value (updated hourly) — 724 | | % Capacity — 728 | Max Value — 732 | Target Value — 736 | |
|---|---|---|---|---|---|---|
| Work in Progress 1 | 15600 | Kg | 78% | 20000 | 0 | Kg |
| Work in Progress 2 | 626 | Each | 18% | 3300 | 2000 | Each |
| Work in Progress 3 | 0 | Each | 0% | 4800 | | |
| Work in Progress 4 | 0 | Each | 0% | 3600 | | |

Machine Information (# machine available)

| Name | Hour1 | Hour2 | Hour3 | Hour4 | Hour5 | Hour6 | Hour7 | Hour8 | Hour9 | Hour10 | Hour11 | Hour12 |
|---|---|---|---|---|---|---|---|---|---|---|---|---|
| Machine 1 | 1 | 1 | 1 | 1 | 1 | 1 | 1 | 1 | 1 | 1 | 1 | 1 |
| Machine 2 | 3 | 3 | 4 | 4 | 4 | 4 | 4 | 4 | 4 | 4 | 4 | 4 |
| Machine 3 | 1 | 1 | 1 | 1 | 1 | 1 | 1 | 1 | 1 | 1 | 1 | 1 |
| Machine 4 | 1 | 1 | 1 | 1 | 1 | 1 | 1 | 1 | 1 | 1 | 1 | 1 |
| Machine 5 | 1 | 1 | 1 | 1 | 1 | 1 | 1 | 1 | 1 | 1 | 1 | 1 |
| Machine 6 | 3 | 3 | 3 | 3 | 3 | 3 | 3 | 3 | 3 | 3 | 3 | 3 |
| Machine 7 | 1 | 1 | 1 | 1 | 1 | 1 | 1 | 1 | 1 | 1 | 1 | 1 |
| Machine 8 | 1 | 1 | 1 | 1 | 1 | 1 | 1 | 1 | 1 | 1 | 1 | 1 |
| Machine 9 | 2 | 2 | 2 | 2 | 2 | 2 | 2 | 2 | 2 | 2 | 2 | 2 |

[ Save Data ]  [ Reset Data ]

*FIG. 8*

Staffing Information (# operators available)

| Name | Hour1 | Hour2 | Hour3 | Hour4 | Hour5 | Hour6 | Hour7 | Hour8 | Hour9 | Hour10 | Hour11 | Hour12 |
|---|---|---|---|---|---|---|---|---|---|---|---|---|
| Type A | 1 | 1 | 1 | 1 | 1 | 1 | 1 | 1 | 1 | 1 | 1 | 1 |
| Type B | 6 | 6 | 6 | 6 | 6 | 6 | 6 | 6 | 6 | 6 | 6 | 6 |
| Type C | 0 | 0 | 0 | 0 | 0 | 0 | 0 | 0 | 0 | 0 | 0 | 0 |
| Type D | 0 | 0 | 0 | 0 | 0 | 0 | 0 | 0 | 0 | 0 | 0 | 0 |
| Type E | 0 | 0 | 0 | 0 | 0 | 0 | 0 | 0 | 0 | 0 | 0 | 0 |
| Type F | 0 | 0 | 0 | 0 | 0 | 0 | 0 | 0 | 0 | 0 | 0 | 0 |

Optimized Staffing Schedule

| Period | Machine 1 | Machine 2 | Machine 3 | Machine 4 | Machine 5 | Machine 6 | Machine 7 | Machine 8 | Machine 9 | Machine 10 |
|---|---|---|---|---|---|---|---|---|---|---|
| 1 | C | B | C,C | C | | | C,C | | | |
| 2 | C | B | | C | | C | C | | C | C |
| 3 | C | B | C | | | C | C | | C | C |
| 4 | C | B | C | C | | | | | C | C,C |
| 5 | C | B | C | | | C | | | | |
| 6 | C | | C | C | | C | | | | |
| 7 | C | B | C | C | | C | C,C | | | C |
| 8 | C | B | C | C | | C | | | | |
| 9 | C | B | C | C | | C | C,C | | | |
| 10 | C | B | C | | | | | | C | C,C |
| 11 | C | | C | C | | | | | | |
| 12 | C | B | C | C | | C | | | | |

| | Total Throughput | | |
|---|---|---|---|
| Machine | Total Throughput | Unit | |
| Machine 1 | 12045 | EA |
| Machine 2 | 2347 | EA |
| Machine 3 | 1383 | EA |
| Machine 4 | 985 | EA |
| Machine 5 | 866 | EA |
| Machine 6 | 865 | EA |
| Machine 7 | 888 | EA |
| Machine 8 | 3602 | EA |
| Machine 9 | 76 | EA |
| Machine 10 | 1950 | EA |

| Activity | Type | Unit | Initial | Hour1 | Hour2 | Hour3 | Hour4 | Hour5 | Hour6 | Hour7 | Hour8 | Hour9 | Hour10 | Hour11 | Hour12 |
|---|---|---|---|---|---|---|---|---|---|---|---|---|---|---|---|
| Process 1 | buffer | TOTE | 200 | 200 | 200 | 200 | 200 | 200 | 200 | 200 | 200 | 200 | 200 | 200 | 200 |
| Process 2 | buffer | TOTE | 0 | 1 | 1 | 1 | 1 | 1 | 1 | 1 | 1 | 1 | 1 | 1 | 1 |
| Process 3 | buffer | TOTE | 64 | 126 | 189 | 251 | 314 | 375 | 439 | 502 | 564 | 592 | 654 | 717 | 779 |
| Process 4 | buffer | TOTE | 0 | 19 | 14 | 18 | 25 | 33 | 27 | 35 | 28 | 24 | 33 | 35 | 30 |
| Process 5 | buffer | TOTE | 39 | 44 | 52 | 53 | 60 | 67 | 69 | 77 | 85 | 86 | 92 | 100 | 108 |
| Process 6 | buffer | TOTE | 0 | 520 | 520 | 520 | 520 | 520 | 520 | 520 | 520 | 520 | 520 | 520 | 520 |
| Process 7 | buffer | TUBE | 569 | 519 | 622 | 732 | 811 | 841 | 907 | 882 | 862 | 971 | 971 | 964 | 967 |
| Process 8 | buffer | TUBE | 0 | 1 | 1 | 1 | 1 | 1 | 1 | 1 | 1 | 1 | 1 | 1 | 1 |
| Process 9 | buffer | TUBE | 0 | 123 | 118 | 101 | 101 | 42 | 77 | 117 | 40 | 42 | 119 | 119 | 119 |
| Process 10 | buffer | TUBE | 0 | 1 | 1 | 1 | 1 | 1 | 1 | 1 | 1 | 1 | 1 | 1 | 1 |
| Process 11 | buffer | TUBE | 120 | 150 | 141 | 150 | 150 | 124 | 150 | 69 | 150 | 16 | 0 | 0 | 0 |
| Process 12 | buffer | TUBE | 0 | 30 | 30 | 30 | 30 | 30 | 30 | 30 | 30 | 30 | 7 | 11 | 11 |
| Process 13 | buffer | TUBE | 0 | 3263 | 2751 | 2669 | 2298 | 2157 | 2085 | 1950 | 1766 | 1786 | 1342 | 1067 | 806 |
| Process 14 | buffer | TUBE | 0 | 1 | 1 | 1 | 1 | 1 | 1 | 1 | 1 | 1 | 1 | 1 | 1 |
| Process 15 | buffer | TUBE | 26 | 154 | 364 | 424 | 702 | 777 | 817 | 889 | 846 | 808 | 1122 | 1374 | 1597 |
| Process 16 | buffer | TUBE | 0 | 30 | 30 | 30 | 30 | 30 | 30 | 30 | 30 | 30 | 30 | 30 | 30 |
| Process 17 | buffer | TUBE | 90 | 89 | 269 | 173 | 156 | 249 | 155 | 247 | 452 | 466 | 540 | 540 | 540 |

FIG. 12

METHODS, SYSTEMS, AND APPARATUS FOR RESOURCE ALLOCATION IN A MANUFACTURING ENVIRONMENT

FIELD

The present disclosure relates, generally, to managing a manufacturing environment. In an example embodiment, the disclosure relates to optimizing the scheduling of operators and other resources in a manufacturing environment.

BACKGROUND

Manufacturing operations often involve a variety of resources, processes, and buffers. The main resources in the manufacturing environment are operators and machines. The processes transform items, such as intermediate products, into final products or other intermediate products and the buffers hold the items. Each process has an associated cycle time, or processing time, indicating how long it takes to convert input items to the produced, or output, items. The buffers are characterized, for example, by a maximum capacity and an inventory level.

Some processes operate continuously, whereas other processes operate as needed and/or as scheduled. Each process may be performed by one or more machines; each machine may be dedicated to performing one type of process or may be capable of performing a number of different processes. In addition, a number of machine types may be available to perform a particular process with different throughputs, processing times, and the like.

Each machine may require one or more human operators during at least some part of the process. For example, a human operator may be needed to load the machine, operate the machine, monitor the machine, unload the machine, service the machine, and the like. Each human operator may be capable of operating all of the machines in the manufacturing environment, or only a subset of the machines. Thus, the scheduling of human operators and machines has an important effect on the overall performance of the manufacturing environment, including parameters such as total throughput and manufacturing time.

BRIEF DESCRIPTION OF DRAWINGS

The present disclosure is illustrated by way of example and not limitation in the figures of the accompanying drawings, in which like references indicate similar elements and in which:

FIG. 7 is a diagram illustrating an example user interface for managing a status of a process and buffer of a manufacturing environment, in accordance with an example embodiment;

FIG. 8 is a diagram illustrating an example user interface for managing machine availability information in a manufacturing environment, in accordance with an example embodiment;

FIG. 9 is a diagram illustrating an example user interface for managing staffing availability for a manufacturing environment, in accordance with an example embodiment;

FIG. 10 is a diagram illustrating an example user interface for viewing an optimized staffing schedule for a manufacturing environment, in accordance with an example embodiment;

FIG. 12 is a diagram illustrating an example user interface for viewing the total predicted inventory level for various buffers in a manufacturing environment, in accordance with an example embodiment;

DETAILED DESCRIPTION

Figure 1:
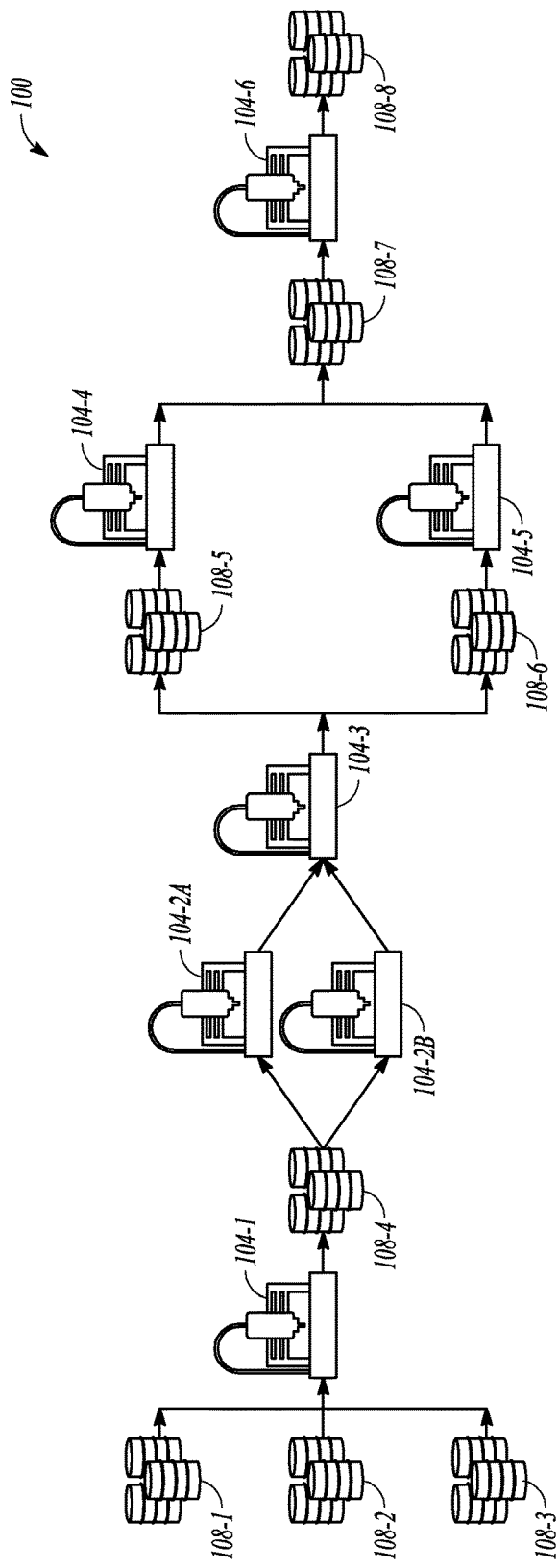
FIG. 1 illustrates a representation of an example manufacturing environment, in accordance with an example embodiment.

The description that follows includes illustrative systems, methods, techniques, instruction sequences, and computing program products that embody example embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for managing a manufacturing environment are disclosed. In one example embodiment, the management includes the scheduling of production and resources, the monitoring of schedule execution, and the automatic revision of schedules. In one example embodiment, the automatic revision of a schedule is performed in response to variability in metrics such as machine throughput and yield that is inherent to the manufacturing environment. In one example embodiment, scheduling described herein relates to the operational timeframe. In one example embodiment, the schedule provides a view of production activities over a defined planning horizon, such as a shift. The scheduling may consider disruptions such as operator breaks, machine downtime, and the like. In one example embodiment, the schedule provides a longer planning horizon, such as a horizon that encompasses a plurality of shifts. Machine operators may be human beings or robotic machines. In one example embodiment, operators optionally may be segregated based on competencies and may only be allocated to a subset of processes or have different throughputs due to, for example, a different level of operator competence. The implementation of the schedule is monitored to detect deviations from production estimates. These deviations may arise from unanticipated changes in yield, machine throughput, operator efficiency, resource availability, and the like. Estimates and probability distributions of these inputs may automatically be updated and the schedule may be revised accordingly.

In one example embodiment, an optimizer generates, for example, a schedule for the machines and/or operators based on one or more manufacturing objectives, such as total throughput, machine throughput, target buffer levels, operator movement, and the like. The optimization is performed based on an initial state of the manufacturing environment. The initial state may be manually entered and/or may be obtained from manufacturing sensors that provide a snapshot of the present and/or historical state of the manufacturing environment, such as present and/or historical machine status, present and/or historical buffer levels, present and/or historical operator status, and the like. In one example embodiment, the initial state also consists of future resource availability. For example, machines may have planned or anticipated downtime and human operators may have breaks in the middle of the planning horizon. In one example embodiment, the optimizer also generates predictions, such as point estimates, of machine throughput, buffer inventory levels, and the like.

In one example embodiment, a simulator, such as a discrete event simulator, simulates manufacturing activity based on an initial state of the manufacturing environment. As described above, the initial state may be manually entered and/or may be obtained from manufacturing sensors that provide a snapshot of the present and/or historical state of the manufacturing environment. In one example embodiment, probability distributions for cycle times, optionally segregated by resource and process task, are automatically updated based on recent sensor data. For example, human operators may improve with more experience. A probability distribution may have greater density for lower cycle times, indicating that the operator is more likely to complete the job earlier. The shape of the distribution may also change. For example, an inexperienced operator may take anywhere between 1 and 2 minutes to complete a task (i.e., a uniform distribution), whereas an experienced operator may take between 30 and 45 seconds to complete the same task.

In one example embodiment, the output of the optimizer, such as a schedule for human operators, can be used as an input to the simulator to simulate the manufacturing operations based on the optimized schedule. The simulator results can be used to evaluate the effectiveness of the schedule (and thereby the effectiveness of the optimizer) and/or to identify changes to the schedule, the manufacturing objectives, and the like. If changes to the manufacturing objectives are made, the optimization may be executed with the new manufacturing objectives and a new schedule(s) may be generated.

In one example embodiment, the simulation output can be used in the monitoring of the execution of a generated or proposed schedule and optionally revise the schedule(s) by triggering execution of the optimizer. The execution of the optimizer may be automatically triggered by a recognized deviation of, for example, one or more production metrics. Predicted production metrics such as hourly throughput and operator utilization may be compared against actual production metrics obtained from sensors and/or manual inputs.

Deviations from predicted metrics may prompt the optimizer to revise the schedule using the updated state of the manufacturing environment 100 and/or flag issues for supervisors. In one example embodiment, a significant deviation is defined as an observed hourly throughput that falls outside of a 95% confidence interval of predicted throughput and a major deviation is defined as an observed hourly throughput that falls outside of a 99% confidence interval of predicted throughput. Additionally, the optimizer may be periodically executed after a fixed amount of time, such as hourly, periodically, and the like, to extend the schedule into the future.

FIG. 1 illustrates a representation of an example manufacturing environment 100, in accordance with an example embodiment. The manufacturing environment 100 comprises a plurality of machines 104-1, . . . 104-N (collectively known as machines 104 hereinafter). Each machine 104 may be designed and/or configured to perform one or more types of processes. In addition, a number of machines 104 of different types may be available to perform a specific process with different throughputs, processing times, and the like. Each machine 104 may also require one or more operators, such as human operators, during at least some part of the process. For example, a human operator may be needed to load the machine 104, operate the machine 104, monitor operation of the machine 104, unload the machine 104, perform maintenance on the machine 104, and the like.

One or more buffers 108-1, . . . 108-N (collectively known as buffers 108 hereinafter) may be provided before, between, and/or after machines 104 to store ingredients, parts, devices, components, sub-assemblies, intermediate products, finished products, and the like (known collectively as items hereinafter). Each buffer 108 has an associated maximum capacity, an associated buffer inventory level that indicates the current inventory level of the buffer 108 and, optionally, a defined target level that indicates a recommended inventory level of the buffer 108. In one example embodiment, the target level comprises a low threshold level and a high threshold level that indicates a range at which the inventory level should be maintained. In one example embodiment, the buffer 108 is implemented as a queue where the elements are removed from the queue in a particular order, such as first-in, first out, or last in, first out.

Each buffer node 108 is characterized by parameters such as maximum capacity, minimum dwell time, expiration time, and the like. The minimum dwell time is the minimum amount of time that an item is to be held in a buffer 108. For example, an item may be held in a buffer 108 to accommodate a drying process. The expiration time is the maximum amount of time that an item may be stored in a buffer node 108 before the product expires (i.e., the product is no longer useable and/or is degraded in quality).

Figure 2:
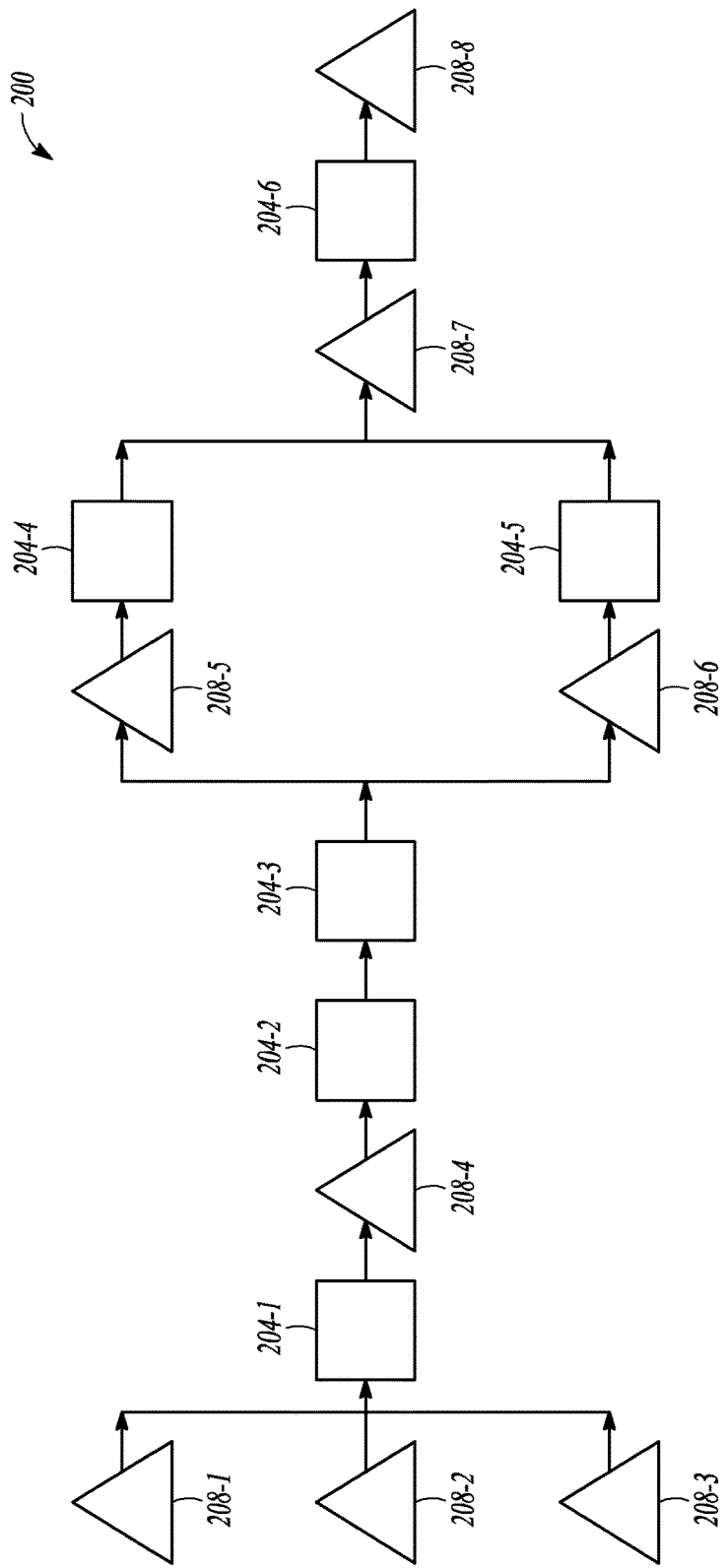
FIG. 2 is a diagram illustrating an example simulation model that models the manufacturing environment of FIG. 1, in accordance with an example embodiment.

FIG. 2 is a diagram illustrating an example simulation model 200 that models the manufacturing environment 100 of FIG. 1, in accordance with an example embodiment. One or more machines 104 of the manufacturing environment 100 are represented by a process node 204-1, . . . 204-N (collectively known as process nodes 204 hereinafter) and one or more buffers 108 of the manufacturing environment 100 are represented by a buffer node 208-1, . . . 208-N (collectively known as buffer nodes 208 hereinafter). Each process node 204, such as process node 204-1, is associated with a processing time that indicates the amount of time needed to complete the corresponding process. The processing time may have a corresponding variance that defines the amount of variation between different performances of the process. In one example embodiment, a point estimate, such as the mean, median, or mode, processing time is associated with each process node 204 and is used for generating the simulation results. For example, the mean processing time of process node 204-1 is fifteen minutes. In one example embodiment, the distribution of processing times for a process is obtained. For example, a user may simply time a number of executions of a process, such as twenty executions, or sensors in the manufacturing environment 100 may measure the amount of time needed to perform the process. A distribution test, such as Kolmogorov-Smirnov, Anderson-Darling, or Chi-squared, may then be used to determine the distribution and associated parameters, such as normal distribution, exponential distribution, and the like, that represent the processing time. A pseudo random number generator is then used to generate samples from the determined distribution. The random numbers are used in executing the simulation. These inputs may automatically be updated over time based on recent sensor data. The simulator may similarly provide results in terms of distributions of various parameters, typically in the form of a mean and confidence interval, rather than an absolute number.

Each buffer node 208 is characterized by parameters such as maximum capacity, minimum dwell time, expiration time, and the like, as described above in conjunction with FIG. 1. In the simulation model 200, buffers nodes 208-1, 208-2, 208-3 store items, also known as material herein, for processing by process node 204-1. The items produced by process node 204-1 are temporarily stored in buffer node 208-4 and are processed by one or more of the machines 104 of the process node 204-2. In particular, process node 204-2 represents two machines 104 of the same type; the machines 104 of the process node 204-2 are capable of operating in parallel. Machines 104 of the same type have substantially the same throughput, batch size, and the like. The quantity of machines 104 of the process node 204-2 that are used for processing items is based on operator availability, machine status (e.g., idle, available, undergoing maintenance, and the like), desired throughput, and the like.

Since the machines 104 of process node 204-2 have substantially identical characteristics, they have the same processing time, batch size, and the like, and are represented by a single process in the simulation (with multiple machines). The items produced by the machine(s) 104 of process node 204-2 are processed by the machine 104 of process node 204-3. In this case, no buffer is needed between the machines 104 of process node 204-2 and process node 204-3.

The intermediate products of process node 204-3 are then processed by the machines 104 of process nodes 204-4, 204-5, respectively. The machines 104 of process nodes 204-4, 204-5 perform the same process, but are not identical machines 104. Thus, the machines 104 of process nodes 204-4, 204-5 differ in one or more of throughput, processing time, operator requirements, and the like. For example, the processing time of the machine 104 of process node 204-4 is approximately thirty minutes and the processing time of the machine 104 of process node 204-5 is approximately fifteen minutes. The machine 104 of process node 204-4 needs one operator for loading while the machine 104 of process node 204-5 is automatically loaded. Prior to processing, the items of process node 204-3 may proceed directly to the machines 104 of process nodes 204-4, 204-5, may be temporarily stored in a single buffer node 208, and the like. In the example embodiment of FIG. 2, each process node 204-4, 204-5 has a corresponding buffer node 208-5, 208-6 for storage of items prior to processing.

The items produced by the machines 104 of process nodes 204-4, 204-5 may be directly processed by the machines 104 of process node 204-6, may be temporarily stored in individual buffer nodes 208 (not shown) dedicated to each machine 104 of process node 204-4, 204-5 or, as shown in FIG. 2, are temporarily stored in buffer node 208-7. The items stored in buffer node 208-7 are then processed by the machines 104 of process node 204-6 to create intermediate and/or finished products. The products of process node 204-7 are then temporarily stored in buffer node 208-8 for further processing and/or shipping to the next destination.

Figure 3:
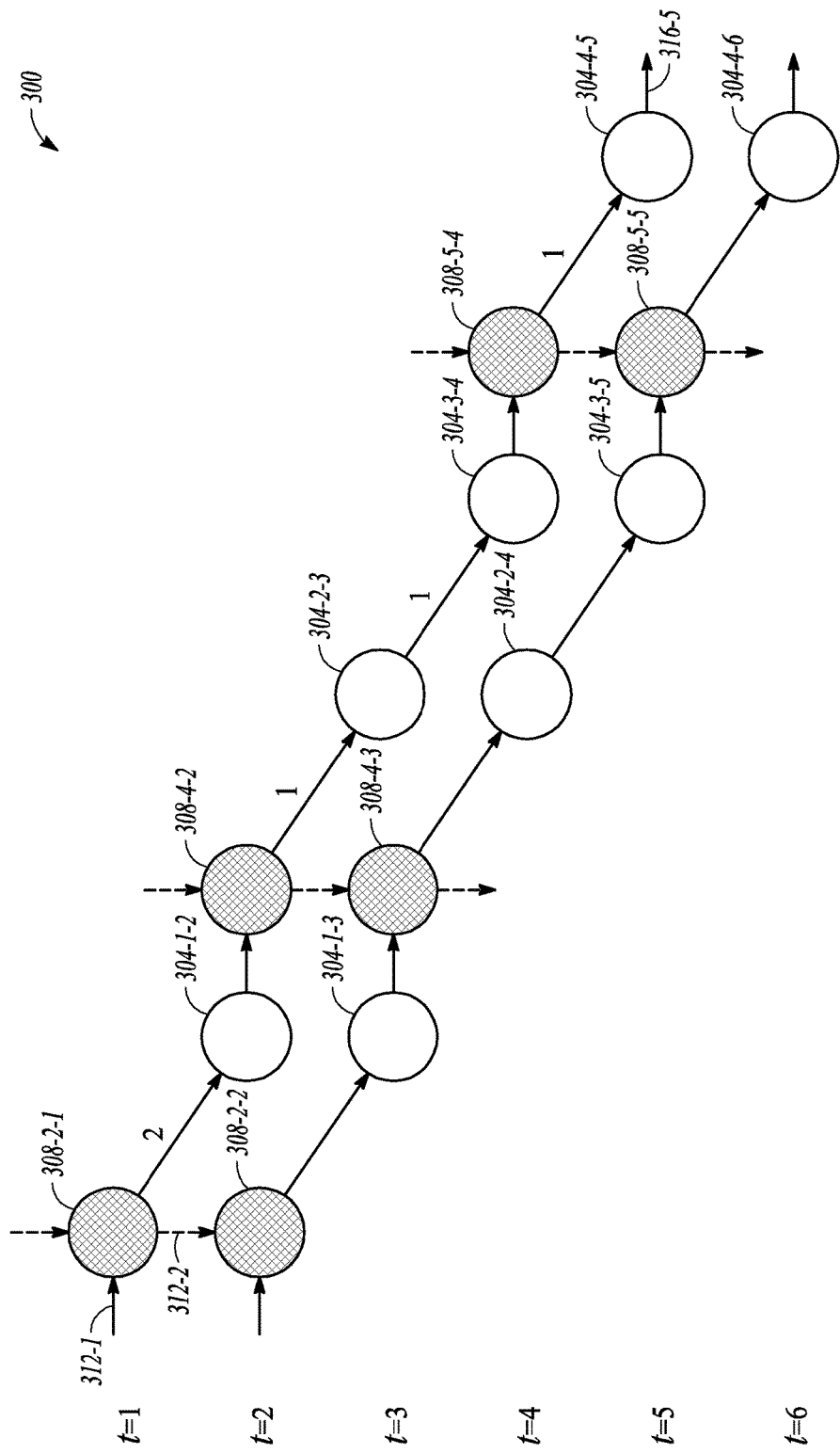
FIG. 3 is a diagram illustrating an example optimization model that models a portion of the manufacturing environment of FIG. 1, in accordance with an example embodiment.

FIG. 3 is a diagram illustrating an example optimization model 300 that models a portion of the manufacturing environment 100 of FIG. 1, in accordance with an example embodiment. The optimization model 300 is a time-expanded network model that captures the process flow of the manufacturing environment 100. While FIG. 2 represents all of the machines 104 and buffers 108 of the manufacturing environment 100, FIG. 3 represents a portion of the manufacturing environment 100 for ease of illustration.

As depicted in FIG. 3, the manufacturing process is represented by discrete time periods t. A time period may be, for example, thirty minutes and may be selected to be on the order of magnitude of a typical process in the manufacturing environment 100. In the optimization model 300, inventory nodes 308-2-1, 308-2-2, . . . (collectively known as inventory nodes 308 hereinafter) are used to represent inventory that may enter the buffers 108 at a particular point in time.

Similarly, the process nodes 304-1-2, 304-1-3, . . . of the optimization model 300 (collectively known as process nodes 304 hereinafter) are used to represent the execution of processes at a particular point in time. The location of the process node 304 indicates the discrete time period t at which the process occurs.

Arcs entering inventory nodes 308 indicate that material enters the buffer at a given period in time. Arcs between inventory nodes 308 capture the inventory held in the associated buffer 108 at a given point in time. For example, the arc from inventory node 308-2-1 to 308-2-2 represents the inventory level of buffer 108-2 at the end of time period 1. The maximum capacity of buffer 108-2 is represented by assigning a capacity to this arc. In general, all such arcs between inventory nodes 308 will have capacity constraints corresponding to the associated capacity of the corresponding buffer 108.

Arcs entering process nodes 304 indicate the execution of the corresponding process 104. For processes that have processing times that exceed the discrete time period t, a plurality of process nodes 304, such as process nodes 304-2-3, 304-3-4, may be used to model the process 104. For example, the processing time of the process represented by nodes 304-2-3, 304-3-4 is sixty minutes. Process node 304-2-3 represents that the process is approximately halfway complete during time period 3, and the process node 304-3-4 represents that the corresponding process is complete by the end of time period 4. Thus, as depicted in FIG. 3, new inventory arrives in the buffer 108-5 (represented by inventory node 308-5-4) only after two discrete time periods t have elapsed, i.e., only after 60 minutes of processing time. Arcs between process nodes 304 indicate that the corresponding process 104 takes multiple periods to complete. For example, arcs between process nodes 304-2-3, 304-3-4 indicate that, as described above, process 104-2 takes two periods to complete; arcs between process nodes 304-3-4, 304-3-5 and corresponding buffer nodes 308-5-4, 308-5-5 indicate that process 104-2 has completed and that its output (or produced items) enters buffer 108-5. Thus, the processing of the material from buffer 108-4 (as represented by inventory node 308-4-2) that was available at time period 2 is completed by the process during time period 4 (as represented by process node 304-3-4). The processed material is available in buffer 108-5 during time period 4 (as represented by inventory node 308-5-4).

For processes that have a plurality of dissimilar machines 104 operating in parallel, additional process nodes 304 and arcs (for each type of machine 104) are used between the inventory nodes 308.

As noted above, each buffer 108 is characterized by parameters such as maximum capacity, minimum dwell time, expiration time, and the like. The minimum dwell time is the minimum amount of time that an item is to be held in a buffer 108. For example, an item may be held in a buffer 108 to accommodate a drying process. To model the minimum dwell time, a process node 304 may be constructed with a processing time equal to the minimum dwell time. In this case, the process node 304 does not need any resources. Inventory nodes 308 may be positioned before and after the cited process node 304; only the cited process node 304 will consume inventory from the preceding inventory node 308, and only subsequent processes will consume inventory from the latter inventory node 308.

Arc 312-1 represents the arrival of additional items for the inventory node 308-2-1 during a first time period. Additionally the outgoing arc 316-5 represents the departure of items from the process 104-4 in period 4. More generally, such incoming and outgoing arcs may be used to represent exogenous supplies and demands for items.

Together, the process nodes 304, inventory nodes 308, and arcs 312-1, 312-2 model the processing times, inventory levels, minimum and maximum buffer holding times, and the like.

In one example embodiment, continuous variables are assigned to the arcs to represent the flow of items in the manufacturing environment 100 and integer variables are assigned to the arcs to represent the resource allocation, such as machines 104 and/or operator requirements. The item flows are connected to the resources through a variable upper bound structure that limits the item flow along an arc unless the corresponding resources are allocated. For example, let arc a represent the arc from 308-2-1 to 304-1-2. A continuous variable $z_a$ may be used to represent the quantity of items processed from buffer 108-2 during time period 1. An integer variable $y_a$ may be used to represent the associated allocation of resources in period 1. The constraint $0 \leq z_a \leq C y_a$ indicates that the total production is limited by the quantity of resources allocated to the associated process. In particular, if $y_a = 0$, then no items may be processed in time period 1.

For processes that have a plurality of identical machines 104 operating in parallel, a single arc is used between the process node 304 and the inventory node 308. Supposing that $y_a$ represents the machine 104-1, if k identical machines 104 may be used for the corresponding process, then the constraint $y_a \in \{0, 1, \ldots, k\}$ is imposed. If multiple resources are needed, (for example, a plurality of machines 104 and/or a plurality of operators), then a plurality of integer variables $y_a^r$ may be used to model each resource. If one resource is selected from a plurality of resources, then this can be captured by the constraints $0 \leq z_a \leq \Sigma_r C_r y_a^r$ and $\Sigma_r y_a^r \leq 1$. The coefficients $C_r$ may reflect that certain resources are capable of producing more throughput than others. For example, more experienced operators may be more efficient than less experienced operators and may have a higher throughput for the corresponding process. These coefficients may be determined from historic data during the distribution fitting techniques applied to the simulation and may be periodically updated.

As described above, each inventory node 308 is characterized by parameters such as maximum capacity, minimum dwell time, expiration time, and the like. Arrow 312-1 represents the arrival of additional items for the inventory node 308-2-1 during a first time period. Arrow 312-2 represents the items remaining after the first time period in the inventory node 308-2-1 that are carried over to the second time period. A constraint of the optimization is therefore that the total amount of inventory to enter a buffer 108 equal the total amount of inventory to be used by the next process plus the inventory that is carried over to the following time period t.

The arc into a process node 304 represents the execution of the corresponding process. Process node 304-1-2 represents the completion of the process corresponding to 104-1 by the end of the second time period. The items produced by the machine 104-1 (represented by process node 304-1-2) are available in the buffer 108-4 by the end of the second time period (as represented by the inventory node 308-4-2).

For processes that have a plurality of dissimilar machines 104 operating in parallel, an arc for each type of machine 104 is used between the process node 304 and the inventory node 308. In this case, a variable $z_t^i$ is assigned to the arc to represent the total item flow for machines 104 of machine type i for time period t and a variable $y_t^i$ is assigned to the arc to represent the count of identical machines 104 of machine type i time period t that are used in the process. The constraints are modeled as $0 \leq z_t^1 \leq y_t^1$ and $0 \leq z_t^2 \leq 2y_t^2$ where $y_t^i$ is an element of $\{0,1\}$.

In one example embodiment, a demand for items from the manufacturing environment 100 by an external process or other entity may be modeled by the optimization model 300. For example, an arc may be added from an inventory node 308 that represents a buffer 108 that contains the demanded item at a time period and that corresponds to the discrete time period t, when the material is needed. Variables are assigned to the arc to capture the item flow and the shortfall, if any.

Figure 4:
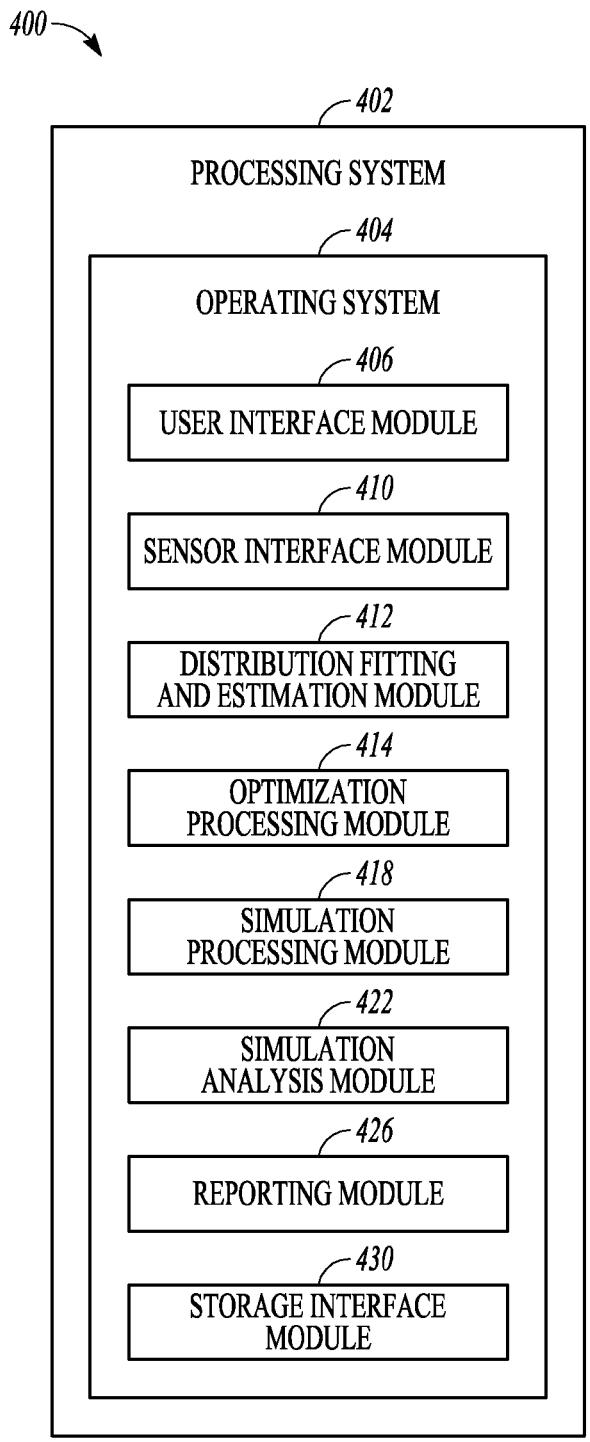
FIG. 4 is a block diagram of an example apparatus for performing optimization and simulation of a manufacturing environment, in accordance with an example embodiment.

FIG. 4 is a block diagram of an example apparatus 400 for performing optimization and simulation of a manufacturing environment 100, in accordance with an example embodiment. The apparatus 400 is shown to include a processing system 402 that may be implemented on a server, client, or other processing device that includes an operating system 404 for executing software instructions. In accordance with an example embodiment, the apparatus 400 may include a user interface module 406, a sensor interface module 410, a distribution fitting and estimation module 412, an optimization processing module 414, a simulation processing module 418, a simulation analysis module 422, a reporting module 426, and a storage interface module 430.

The sensor interface module 410 obtains data from sensors located throughout the manufacturing environment 100. Sensor data includes machine status, machine throughput, machine yield, buffer inventory levels, operator location and status, and the like. The user interface module 406 enables a user to define manufacturing objectives, define process flows, specify resource constraints, enter status information, and to obtain optimization and simulation results related to the manufacturing environment 100, as described below by way of example in conjunction with FIGS. 7-12.

The optimization processing module 414 generates operator schedules, machine schedules, recommended process flows, and the like based on optimization objectives, resource constraints and an initial state of the manufacturing environment 100, as described below by way of example in conjunction with FIGS. 5 and 6. The optimization processing module 414 may also generate predictions of machine throughput, buffer inventory levels, and the like. The optimization is based on mixed integer programming and may use a solver, such as the CPLEX Optimizer manufactured by the IBM Corporation of Armonk, N.Y. or the Gurobi Optimizer 6.0 manufactured by Gurobi Optimization of Houston, Tex., to solve the problem defined by the mixed integer program, as described more fully below by way of example in conjunction with FIG. 6.

The simulation processing module 418 simulates the operation of the manufacturing environment 100 based on an initial state of the manufacturing environment 100. The initial state may be obtained from the sensor data and/or from manually entered data. In one example embodiment, the simulator is a discrete event simulator.

The simulation analysis module 422 analyzes the simulation results generated by the simulation processing module 418. For example, the simulation analysis module 422 may compare simulation performance estimates against sensor data obtained at a corresponding time and may report whether the observed results differ by a significant amount from estimates. For example, if overall throughput falls outside of a 95% confidence interval from the simulation results, this may trigger a revision of the schedule by re-executing the optimizer using previously specified objectives or new objectives. Alternately, more substantial deviations may be flagged and reported to a supervisor.

The reporting module 426 provides optimized schedules, simulation results, and manufacturing issues, such as a report of actual manufacturing results that differ by a substantial amount from the simulation results.

The storage interface module 430 is responsible for storing configuration information, manufacturing objectives, process flows, resource constraints, status information, and sensor data (including machine status, machine throughput, machine yield, buffer levels, operator status, and the like) related to the manufacturing environment 100. The storage interface module 430 is also responsible for storing optimization results, such as operator schedules, and simulation results.

Figure 5:
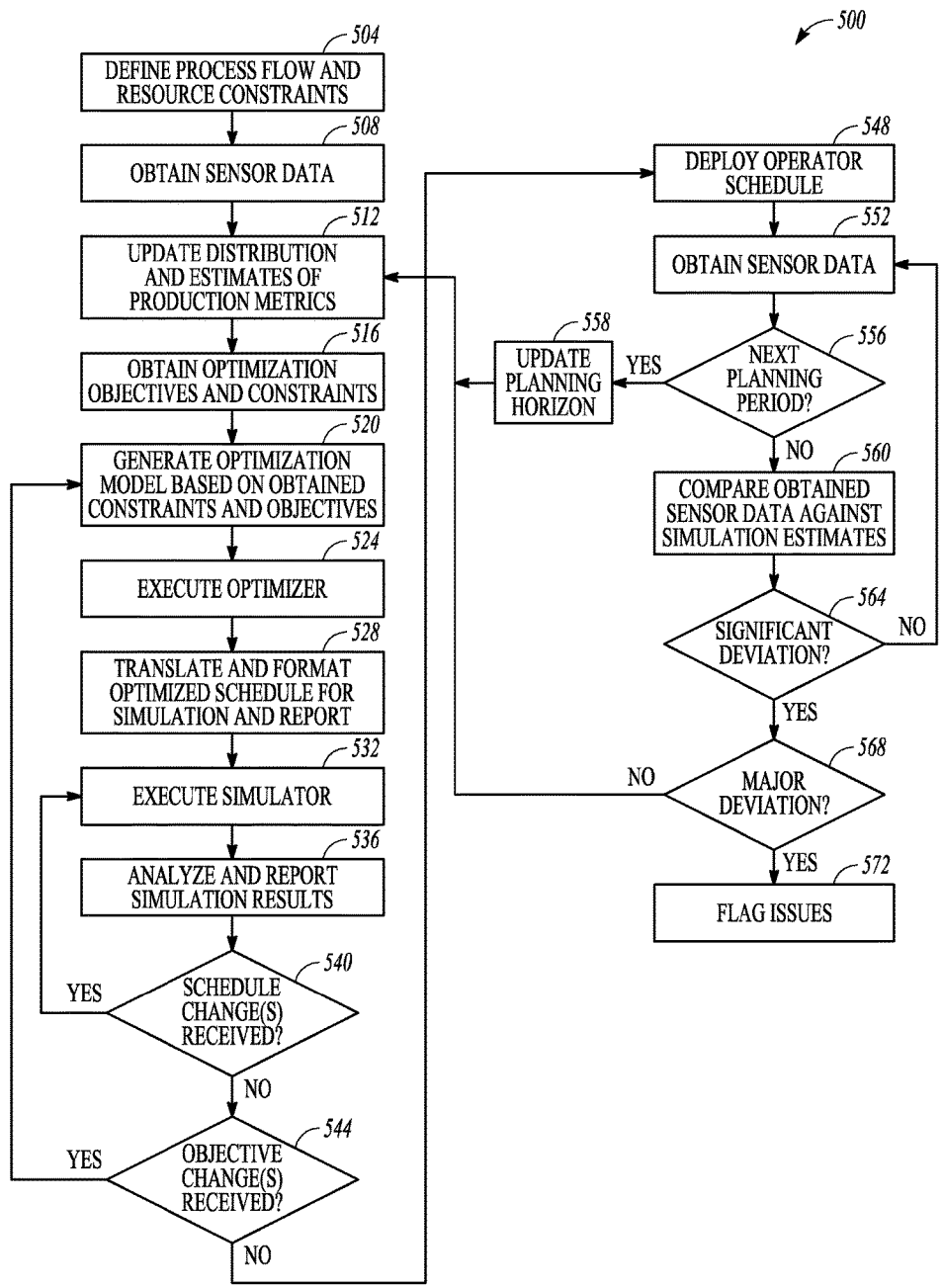
FIG. 5 is a flowchart of an example workflow for managing a manufacturing environment, in accordance with an example embodiment.

FIG. 5 is a flowchart of an example workflow 500 for managing the manufacturing environment 100, in accordance with an example embodiment. In one example embodiment, the process flow of the manufacturing operations (e.g., a network of machines 104 and buffers 108) and the manufacturing constraints, such as resource constraints, are defined and/or obtained (operation 504). For example, the sequence of processes in the manufacturing environment 100, the movement of information (such as reports and the like) through the manufacturing environment 100, the location of buffers 108 in the manufacturing environment 100, and resource constraints (such as the throughput of machines 104, availability of different types of human operators, capacity of buffers 108, buffer thresholds, schedule of operator breaks, and the like) may be defined.

Sensor data may also be obtained that indicates the state of the manufacturing environment 100 (operation 508). The sensor data may correspond to the present state of the manufacturing environment 100, a recent state of the manufacturing environment 100, and/or a previous state of the manufacturing environment 100. The sensor data comprises the status of one or more machines 104 in the manufacturing environment 100, an inventory level of one or more buffers 108, a status and/or a location of one or more operators, a utilization of one or more operators, and the like. The status of a machine 104 may include its current availability, schedule of future maintenance, and the like. The sensor data may be automatically obtained from sensors located in the manufacturing environment 100.

The state of the manufacturing environment 100, or a portion of the state of the manufacturing environment 100, may also be manually entered. For example, the status of machines 104 and current inventory levels of various buffers 108 may be obtained via a user interface, described below by way of example in conjunction with FIG. 7. For example, an operator may count the inventory and enter the inventory level of a buffer 108. In addition, the availability of various types of machines 104, as described below by way of example in conjunction with FIG. 8, and the availability of various types of operators, as described below by way of example in conjunction with FIG. 9, may be obtained.

The sensor data obtained during operation 508 (and/or operation 552) is used, for example, to revise distributions and/or estimates of production metrics (operation 512). For example, the distribution of cycle times may change as operators become better acquainted with the manufacturing process or yields may differ from historical averages requiring a greater amount of rework. There are a number of models available to account for these changes. In one example embodiment, the model is a moving average that only considers the last k observations and estimates future performance by taking an average. In one example embodiment, a distribution may be fitted to the k most recent observations. These modified distributions and estimates may be used in both the optimizer and simulator to better reflect the current manufacturing environment and accordingly adjust the schedule and improve predictions generated by the simulator.

In one example embodiment, objectives and constraints for performing the optimization are obtained (operation 516). For example, manufacturing objectives, such as total throughput, throughputs of individual machines 104, target inventory levels of buffers 108, low and/or high threshold levels for buffers 108, operator movement, and the like may be obtained. Buffer thresholds specify, for example, values between which buffer quantities should be maintained. An operator movement is, for example, a reassignment of an operator from one machine 104 to another machine 104. In one example embodiment, a manufacturing objective may be to limit movement of a particular operator and/or a particular type of operator to two moves per hour. In one example embodiment, a manufacturing constraint may be to schedule a 30 minute lunch break for operators between 12 PM and 1 PM, possibly staggering breaks to keep key processes running.

An optimization model, as described by way of example in conjunction with FIG. 3, is created (operation 520). In one example embodiment, variables in this model are defined based on the time-expanded network flow structure. Initial inventory levels and target throughput are represented by exogenous flows (e.g. 312-1 and 316-5). The flow of items is captured through continuous variables and the standard flow balance constraints, as described above. In one example embodiment, the standard flow balance constraints are modified to account for yields. Resource allocation is captured by integer variables and the variable upper bounds, as described above. Manufacturing objectives are mapped to these variables using user preferences to assign weights. In one example embodiment, the optimization model is predefined and is simply obtained during operation 520.

The optimization is then performed based on the model produced in operation 520 to generate, for example, a schedule for human operators (including, optionally, operator breaks) and/or machines 104, as described below by way of example in conjunction with FIGS. 6 and 10 (operation 524). The schedule generated by the optimizer may be used for assigning operators to tasks, such as loading a machine 104, monitoring a machine 104, unloading a machine 104, servicing a machine 104, moving items within the manufacturing environment 100, and the like. The schedule may also be translated and/or formatted for use in simulating the manufacturing environment 100 based on the generated schedule (operation 528).

In one example embodiment, the simulator may be executed based on the obtained status data (operation 532). The simulation is based on the sensor data obtained prior to optimization (such as sensor data obtained during operation 508) or obtained after optimization (such as sensor data that may be obtained during operation 532). In addition, the simulation may be based on the schedule generated by the optimizer or may be based on a schedule that is manually input or manually modified. Output of the simulation are analyzed and reported in operation 536 to provide, for example, estimates and confidence intervals of total throughput, inventory levels of buffers 108, throughputs of machines 104, utilization of operators, average inventory level of buffers 108, dwell times of items in buffers 108, and the like. For example, the throughput of various machines 104, as described below by way of example in conjunction with FIGS. 11A and 11B, and the inventory levels of various buffers 108, as described below by way of example in conjunction with FIG. 12, may be predicted.

In one example embodiment, the simulation results are then provided to, for example, a user, such as a manufacturing manager or foreman, who may optionally modify the schedule and/or the optimization objectives (e.g., manufacturing objectives). Changes to the schedule and/or manufacturing objectives are determined by users of the manufacturing environment 100 for, for example, business reasons and are beyond the scope of the present disclosure. In one example embodiment, a test is therefore performed to determine if schedule changes have been received (operation 540). If schedule changes have been received, the simulation is executed again (operation 532). If schedule changes have not been received, a test is performed to determine if changes to the manufacturing objectives have been received (operation 544). For example, a manufacturing manager or foreman may issue changes to the manufacturing objectives based on the simulation results. If changes to the manufacturing objectives have been received, the optimizer is executed again (operation 520).

If changes to the manufacturing objectives have not been received, the schedule is deployed (operation 548). Sensor data may be obtained immediately, continuously, periodically, after a delay period, and the like (operation 552). In one example embodiment, sensor data is obtained at a time corresponding to a time of the simulation results. For example, the sensor data may be obtained after a delay time, such as 30 minutes, that is equal to the simulation time period.

In one example embodiment, a test is performed to determine if the time for planning for the next planning horizon has arrived (operation 556). If the time for planning for the next planning horizon has arrived, the planning horizon of the schedule is updated to specify a new time period (operation 558) and the method 500 proceeds with operation 512. The optimization is re-executed and the schedule is advanced. For example, after an hour has passed, the optimizer may revise the schedule for the next twelve hours. The simulator revises performance estimates and confidence intervals, and the new schedule is deployed. If the time for planning for the next planning horizon has not arrived, the obtained sensor data is compared to the optimization and/or simulation results (operation 560). For example, the actual inventory levels of various buffers 108 in the manufacturing environment 100 may be compared to the inventory levels predicted by the optimization and/or simulation results. In one example embodiment, a test is performed to determine if there is a significant deviation between one or more of the simulation estimates and the sensor data (operation 564). A significant deviation may be indicative of a manufacturing issue, an optimizer issue, and/or a simulator issue. For example, if the overall manufacturing throughput falls outside of, for example, a 99% confidence interval generated by the simulation results, a significant deviation exists. In general, a significant deviation may be based on an estimate or measurement falling outside of a confidence interval, based a certain percentage deviation from the predicted value, and the like. Additionally, certain events may be flagged as a significant deviation, such as a machine unexpectedly breaking down, operators unexpectedly leaving in the middle of a shift, and the like. If there is no significant deviation, the method 500 proceeds with operation 552; otherwise, a test is performed to determine if there is a major deviation between one or more of the simulation estimates and the sensor data (operation 568). A major deviation may also be based on an estimate or measurement falling outside of a confidence interval, based a certain percentage deviation from the predicted value, and the like. As with a significant deviation, certain events may be flagged as a major deviation, such as a machine unexpectedly breaking down, operators unexpectedly leaving in the middle of a shift, and the like. Smaller deviations may prompt automated revision of the schedule without human intervention. If there is no major deviation, the method 500 proceeds with operation 512; otherwise, an issue flag may be raised. The raising of a flag may be indicative of an issue with the manufacturing process, an issue with the optimizer, and/or an issue with the simulator. In one example embodiment, operations 552 to 568 may be repeated periodically, at scheduled times, and the like.

Figure 6:
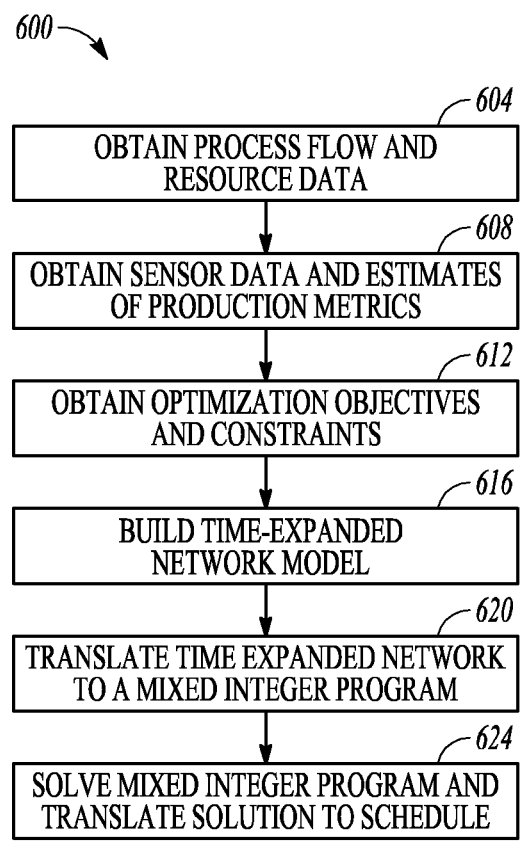
FIG. 6 is a flowchart of an example method for creating an optimization model of a manufacturing environment, in accordance with an example embodiment.

FIG. 6 is a flowchart of an example method 600 for creating an optimization model of the manufacturing environment 100, in accordance with an example embodiment. The optimization model may be a time-expanded network that captures the process flow of the manufacturing environment 100, as described above by way of example in conjunction with FIG. 3.

In one example embodiment, process flow and resource data for constructing the optimization model is obtained (operation 604). For example, process flows, machine data, labor qualifications, buffer sizes, and the like, may be obtained. The process flow, such as is partially represented by FIG. 3, may be obtained. In one example embodiment, the initial state of the manufacturing environment 100 and estimates of production metrics such as operator throughputs, yields, and the like, are obtained (operation 608). For example, the status of machines 104 and current inventory levels of various buffers 108 may be obtained, as described below by way of example in conjunction with FIG. 7. In addition, the availability of various types of machines 104, as described below by way of example in conjunction with FIG. 8, and the availability of various types of operators, as described below by way of example in conjunction with FIG. 9, may be obtained. Optimization objectives and constraints are obtained (operation 612). For example, users may specify that the schedule emphasize throughput of a bottleneck process or that the schedule permit workers a break in the middle of a shift.

The optimization model 300 of the manufacturing environment 100 is constructed (operation 616). In one example embodiment, the optimization model 300 is a time-expanded network model. As described above by way of example in conjunction with FIG. 3, the manufacturing process is represented by discrete time periods t. A time period may be, for example, thirty minutes. Process nodes 304 are used to represent completed processes, and inventory nodes 308 are used to represent item inventory levels of buffers 108 at a particular point in time. Maximum capacities are assigned to arcs to represent limits on buffer capacity and machine throughput. Together, the process nodes 304, inventory nodes 308, and arcs model the processing times, inventory levels, minimum and maximum buffer holding times, and the like of the manufacturing environment 100.

In one example embodiment, the optimization model 300 is translated to a mixed integer program (operation 620). In one example embodiment, continuous variables are assigned to arcs to represent the flow of items in the manufacturing environment 100 and integer variables are assigned to arcs to represent resource requirements, such as machine 104 or operator requirements. The item flows are connected to the resources through a variable upper bound structure. In one example embodiment, integer variables that represent worker allocation may be used as a constraint that represents an operator break time and account for, for example, an operator lunch break.

The resulting mixed integer program produced in operation 620 is then solved by a solver, such as CPLEX Optimizer manufactured by the IBM Corporation of Armonk, N.Y. or the Gurobi Optimizer 6.0 manufactured by Gurobi Optimization of Houston, Tex., of the optimization processing module 414 during operation 624 of the workflow 600. A solution to the mixed integer program is then translated using the optimization model 300 to generate schedules, such as the machine 104 and operator schedules, for resource allocation.

FIG. 7 is a diagram illustrating an example user interface 700 for managing a status of a process and buffer 108 of the manufacturing environment 100, in accordance with an example embodiment. The user interface 700 may be provided by the user interface module 406.

In one example embodiment, general information regarding a manufacturing process is displayed. For example, the time of the last processing by the machine 104-3 may be entered in field 704. For example, the time of the last firing of a kiln may be entered in field 704. An inventory level of widgets used to physically support intermediate products that are to be used in the processing by the machine 104-3 may be entered in field 708. In one example embodiment, the estimated hourly demand of intermediate products to be produced by the machine 104-3 (and therefore the estimated hourly demand of widgets) may be entered in field 712. The base hour of a manufacturing time period may be entered in field 716. For example, if a twelve hour time period begins at 8 AM, then 8:00 AM may be entered in field 716.

In one example embodiment, each row 740-1, . . . 740-N (collectively known as rows 740 hereinafter) of the user interface 700 corresponds to work in progress. Column 720 provides a description of the work that is in progress, column 724 provides the current inventory level of the item corresponding to the work in progress, column 728 provides the current inventory (i.e., fill) level of the buffer 108 and/or machine 104 that contain the item (in percent of maximum capacity), column 732 provides the maximum capacity of the corresponding buffer 108 and/or machine 104 that contain the item, and column 736 provides an optional target value for the corresponding buffer 108 and/or machine 104 that contain the item. The target value is the desired inventory level of the corresponding buffer 108 and/or machine 104 that contain the item. The target value is typically determined by managers of the manufacturing environment 100 for business reasons and is beyond the scope of the present disclosure. The inventory level, the capacity, and the target value may be indicated in terms of units, weight, volume, and the like. The inventory level may be updated continuously, at scheduled times, upon a substantial change to the inventory level, and the like. For example, as shown in FIG. 7, the inventory level may be updated hourly.

FIG. 8 is a diagram illustrating an example user interface 800 for managing machine availability information, in accordance with an example embodiment. The user interface 800 may be provided by the user interface module 406.

In one example embodiment, each row 812-1, . . . 812-N (collectively known as rows 812 hereinafter) of the user interface 800 corresponds to a type of machine 104 of the manufacturing environment 100. Column 804 provides the name of the machine 104 and columns 808-1, . . . , 808-N (collectively known as columns 808 hereinafter) provide the quantity of machines 104 of the corresponding machine type that are available for a particular hour. For example, column 808-1 indicates the number of machines 104 available for hour one of a twelve hour shift, and column 808-2 indicates the number of machines 104 available for hour two of a twelve hour shift. As shown in FIG. 8, one type 1 machine, three type 2 machine, and one type 3 machine are available for hour two. The data entered via user interface 800 may be saved by selecting a save data button 816, and the data displayed in user interface 800 may be reset by selecting a reset data button 820. In one example embodiment, selecting the reset data button 820 resets the data displayed in the user interface 800 to the values of the most recently saved version.

FIG. 9 is a diagram illustrating an example user interface 900 for managing staffing availability for the manufacturing environment 100, in accordance with an example embodiment. The user interface 900 may be provided by the user interface module 406.

In one example embodiment, each row 912-1, . . . 912-N (collectively known as rows 912 hereinafter) of the user interface 900 corresponds to a type of operator of the manufacturing environment 100. In one example embodiment, an operator may be a human being or a robotic machine. Column 904 provides the name of the type of operator or the name of a specific operator; and columns 908-1, . . . , 908-N (collectively known as columns 908 hereinafter) provide the quantity of operators of the corresponding operator type that are available during a particular hour, if applicable. For example, column 908-1 indicates the number of operators available during hour one of a twelve hour shift, and column 908-2 may indicate the number of operators available during hour two of a twelve hour shift. As shown in FIG. 9, one type A operator, six type B operators, and no type C operators are available during hour two.

FIG. 10 is a diagram illustrating an example user interface 1000 for viewing an optimized staffing schedule for the manufacturing environment 100, in accordance with an example embodiment. The user interface 1000 may be provided by the user interface module 406 and may be generated by the optimization processing module 414, as described above by way of example in conjunction with FIG. 6.

In one example embodiment, each row 1012-1, . . . 1012-N (collectively known as rows 1012 hereinafter) of the user interface 1000 corresponds to a time period of operation of the manufacturing environment 100. For example, each row 1012 may correspond to a one hour time period of operation of the manufacturing environment 100. In one example embodiment, column 1004 provides an identifier of the time period and columns 1008-1, . . . , 1008-N (collectively known as columns 1008 hereinafter) provide an assignment of a type(s) of operator to a corresponding machine 104 for a particular time period. In one example embodiment, column 1008 indicates the quantity of operators assigned to the corresponding machine 104. For example, column 1008-4 indicates that two type C operators are assigned to machine 3 for hour one, no type C operators are assigned to machine 3 for hour two, and one type C operator is assigned to machine 3 for hour three.

Figures 11A, 11B:
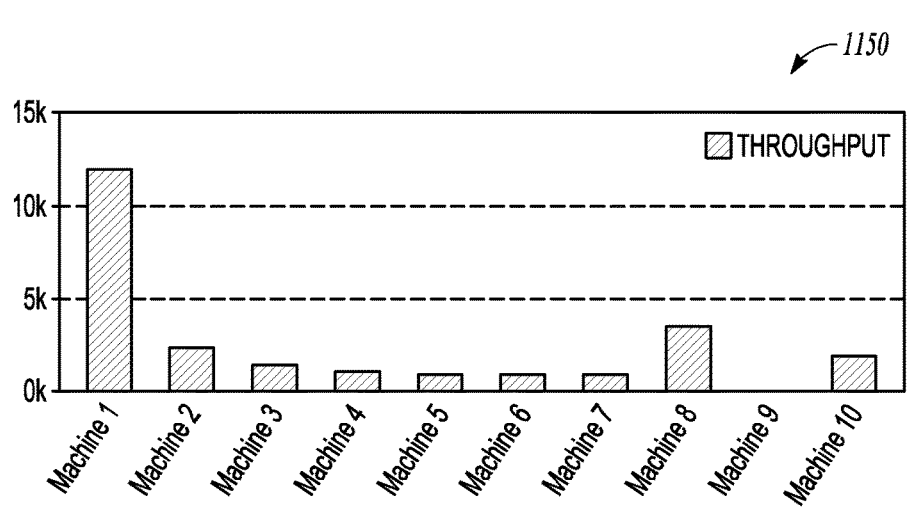
FIG. 11A is a diagram illustrating an example user interface for viewing the total predicted throughput for various machines in a manufacturing environment, in accordance with an example embodiment.
FIG. 11B is a diagram illustrating an example user interface for viewing a bar graph of the total predicted throughput for various machines in a manufacturing environment, in accordance with an example embodiment.

FIG. 11A is a diagram illustrating an example user interface 1100 for viewing the total predicted throughput for various machines 104 in the manufacturing environment 100, in accordance with an example embodiment. The user interface 1100 may be provided by the user interface module 406 and the throughput may be predicted by the optimization processing module 414, as described above by way of example in conjunction with FIG. 6.

In one example embodiment, the throughput for each of a plurality of machines 104 is predicted during the optimization process. Each row 1116-1, . . . 1116-N (collectively known as rows 1116 hereinafter) of the user interface 1100 corresponds to a type or instance of machine 104 of the manufacturing environment 100. In one example embodiment, column 1104 provides a description and/or name of the type of machine 104, column 1108 provides the total throughput for the corresponding machine type, and column 1112 provides the unit type of the items produced by the corresponding machine type. In one example embodiment, a row 1116 is provided for the total throughput of each instance of a machine 104.

FIG. 11B is a diagram illustrating an example user interface 1150 for viewing a bar graph of the total predicted throughput for various machines 104 in the manufacturing environment 100, in accordance with an example embodiment. The user interface 1150 may be provided by the user interface module 406 and the throughput may be predicted by the optimization processing module 414, as described above by way of example in conjunction with FIG. 6. In one example embodiment, each bar of the bar graph represents the total throughput for the corresponding type of machine 104. In one example embodiment, a bar is provided for the total throughput of each instance of a machine 104.

FIG. 12 is a diagram illustrating an example user interface 1200 for viewing the total predicted inventory levels for various buffers 108 in the manufacturing environment 100, in accordance with an example embodiment. The user interface 1200 may be provided by the user interface module 406 and the total predicted inventory levels may be generated by the optimization processing module 414, as described above by way of example in conjunction with FIG. 6.

In one example embodiment, each row 1216-1, . . . 1216-N (collectively known as rows 1216 hereinafter) of the user interface 1200 corresponds to a type of process of the manufacturing environment 100. In one example embodiment, an operator may be a human being or a robotic machine. Column 1204 provides the name of the type of process (or activity), column 1208-1 provides the type of resource (such as a buffer 108), column 1208-2 provides the type of item stored in the corresponding buffer 108 (such as a tube), column 1208-3 provides the initial inventory level for the corresponding buffer 108, and columns 1212-1, . . . , 1212-N (collectively known as columns 1212 hereinafter) provide the inventory level of the corresponding buffer 108 for a particular hour. For example, column 1212-1 indicates the inventory level during hour one of a twelve hour shift and column 1212-2 indicates the inventory level during hour two of the twelve hour shift. As shown in FIG. 12, 30 tubes are available for process 12 and 2,751 tubes are for process 13 during hour two.

Figure 13:
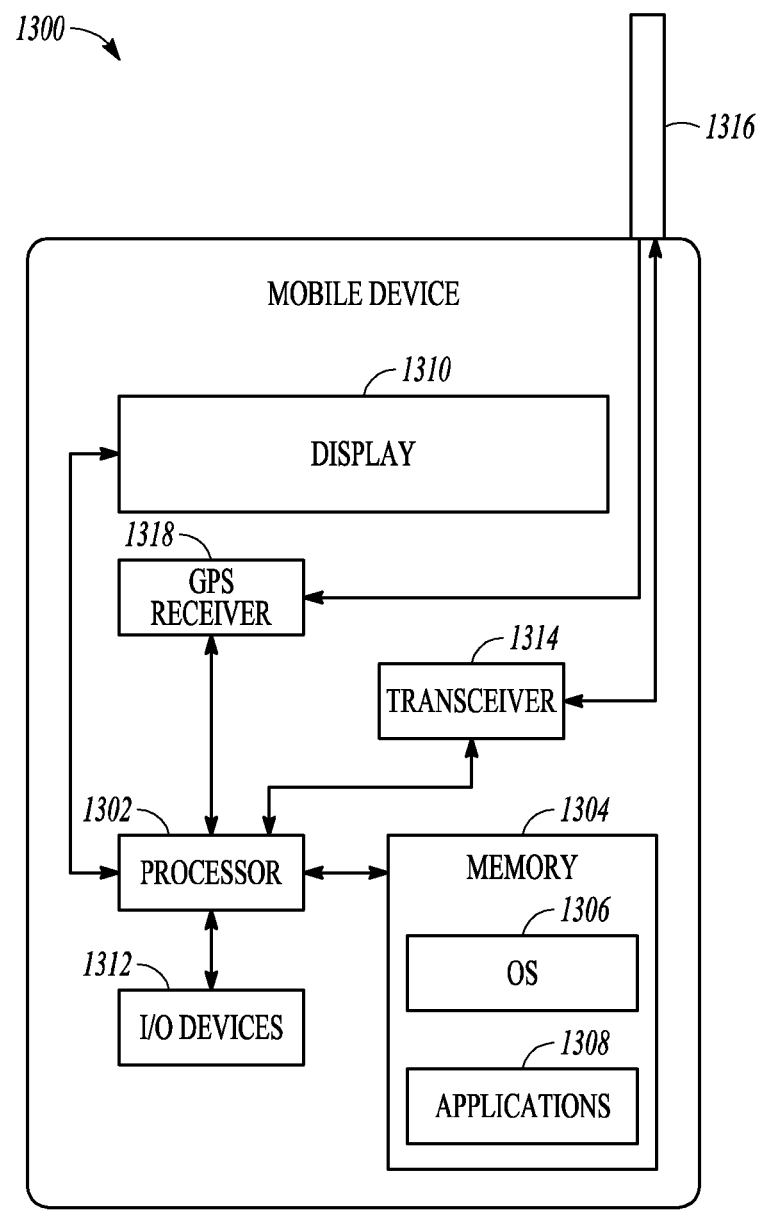
FIG. 13 is a block diagram illustrating a mobile device, according to an example embodiment.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as applications 1308, such as a mobile location-enabled application that can provide location-based services (LBSs) to a user. The processor 1302 can be coupled, either directly or via appropriate intermediary hardware, to a display 1310 and to one or more input/output (I/O) devices 1312, such as a keypad, a touch panel sensor, and a microphone. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Figure 14:
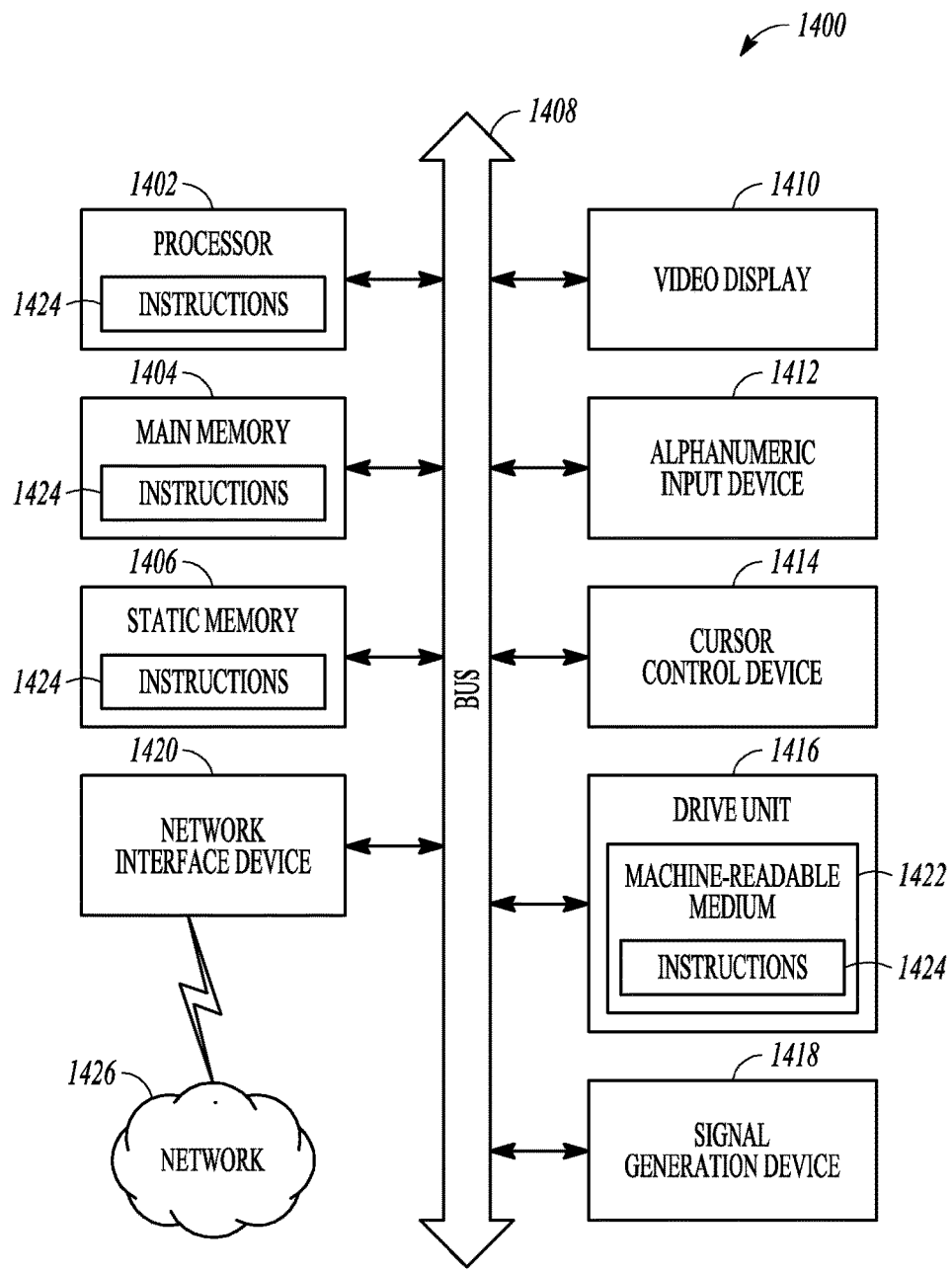
FIG. 14 is a block diagram of a computer processing system within which a set of instructions may be executed for causing a computer to perform any one or more of the methodologies discussed herein.

FIG. 14 is a block diagram of a computer processing system 1400 within which a set of instructions 1424 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1400 includes a processor 1402 (e.g., a central processing unit (CPU), a graphics processing unit (GPU), or both), a main memory 1404, and a static memory 1406, which communicate with each other via a bus 1408. The computer processing system 1400 may further include a video display 1410 (e.g., a plasma display, a liquid crystal display (LCD), or a cathode ray tube (CRT)). The computer processing system 1400 also includes an alphanumeric input device 1412 (e.g., a keyboard), a user interface (UI) navigation (or cursor control) device 1414 (e.g., a mouse and/or touch screen), a drive unit 1416, a signal generation device 1418 (e.g., a speaker), and a network interface device 1420.

The drive unit 1416 includes a machine-readable medium 1422 on which is stored one or more sets of instructions 1424 and data structures embodying or utilized by any one or more of the methodologies or functions described herein. The instructions 1424 may also reside, completely or at least partially, within the main memory 1404, the static memory 1406, and/or within the processor 1402 during execution thereof by the computer processing system 1400, the main memory 1404, the static memory 1406, and the processor 1402 also constituting tangible machine-readable media 1422.

The instructions 1424 may further be transmitted or received over a network 1426 via the network interface device 1420 utilizing any one of a number of well-known transfer protocols (e.g., Hypertext Transfer Protocol).

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions 1424. The term "machine-readable medium" shall also be taken to include any medium that is capable of storing, encoding, or carrying a set of instructions 1424 for execution by the computer and that cause the computer to perform any one or more of the methodologies of the present application, or that is capable of storing, encoding, or carrying data structures utilized by or associated with such a set of instructions 1424. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method for managing a manufacturing environment, the method comprising:
    obtaining first sensor data from one or more sensors deployed in a manufacturing environment, the first sensor data indicating an initial state of the manufacturing environment;
    obtaining second sensor data from the one or more sensors deployed in the manufacturing environment, the second sensor data indicating a current state of the manufacturing environment;
    storing the first sensor data in an initial state data structure;
    revising estimates of production metrics based upon the second sensor data;
    translating an optimization model to a mixed integer program;
    solving the mixed integer program;
    translating, using an optimizer comprising at least one of one or more hardware devices, a solution to the mixed integer program using the optimization model to generate an optimized schedule for operators of the manufacturing environment based on an optimization data structure, the optimization data structure comprising one or more manufacturing objectives and one or more resource constraints;
    simulating, using a simulator comprising at least one of the one or more hardware devices, manufacturing activity based on the generated optimized schedule, the revised estimates of production metrics, and the initial state data structure;
    storing simulation results in a simulation data structure; and
    analyzing the simulation results in the simulation data structure to determine a satisfaction of the manufacturing objectives.

2. The method of claim 1, further comprising repeating the generating, simulating, storing, and analyzing operations based on one or more revised manufacturing objectives.

3. The method of claim 1, wherein the generating operation generates an optimized schedule for one or more machines of the manufacturing environment.

4. The method of claim 1, wherein the manufacturing objectives comprise one or more of total throughput of the manufacturing environment, target machine throughput, target buffer levels, and target operator movement.

5. The method of claim 1, wherein the generating operation is based on the initial state of the manufacturing environment.

6. The method of claim 1, wherein the initial state of the manufacturing environment is obtained from sensors located in the manufacturing environment.

7. The method of claim 1, further comprising generating predictions of one or more of machine throughput and buffer inventory levels.

8. The method of claim 1, further comprising generating a report based on the analysis of the simulation results, the report indicating an issue with one or more of the optimizer, the simulator, and the manufacturing environment.

9. The method of claim 1, further comprising revising estimates of one or more manufacturing metrics, regenerating the optimized schedule and simulating manufacturing activity based on the regenerated optimized schedule and a manufacturing state data structure.

10. The method of claim 1, wherein the simulator is a discrete event simulator.

11. A system for processing events, the system comprising:
one or more sensors deployed in a manufacturing environment that are configured to obtain first sensor data and second sensor data, the first sensor data indicating an initial state of the manufacturing environment, the second sensor data indicating a current state of the manufacturing environment;
one or more hardware processors;
memory to store instructions that, when executed by the one or more hardware processors perform operations comprising:
storing the first sensor data in an initial state data structure;
revising estimates of production metrics based upon the second sensor data;
generating one or more probability distributions characterizing one or more manufacturing metrics based upon historic data;
translating an optimization model to a mixed integer program, solving the mixed integer program; translating a solution to the mixed integer program using the optimization model to generate an optimized schedule for operators of a manufacturing environment based on an optimization data structure, the optimization data structure comprising one or more manufacturing objectives and one or more resource constraints;
simulating manufacturing activity based on the generated optimized schedule, the revised estimates of production metrics, and the initial state data structure; and
analyzing the simulation results in the simulation data structure to determine a satisfaction of the manufacturing objectives.

12. The system of claim 11, further comprising repeating the generating, simulating, storing, and analyzing operations based on one or more revised manufacturing objectives.

13. The system of claim 11, wherein the generating operation generates an optimized schedule for one or more machines of the manufacturing environment.

14. The system of claim 11, wherein the manufacturing objectives comprise one or more of total throughput of the manufacturing environment, target machine throughput, target buffer levels, and target operator movement.

15. The system of claim 11, wherein the generating operation is based on the initial state of the manufacturing environment.

16. The system of claim 11, wherein the initial state of the manufacturing environment is obtained from sensors located in the manufacturing environment.

17. The system of claim 11, further comprising generating predictions of one or more of machine throughput and buffer inventory levels.

18. The system of claim 11, further comprising generating a report based on the analysis of the simulation results, the report indicating an issue with one or more of the optimization processing module, the simulation processing module, and the manufacturing environment.

19. A non-transitory machine-readable storage medium comprising instructions that, when executed by one or more processors of a machine, cause the machine to perform operations comprising:
obtaining first sensor data from one or more sensors deployed in a manufacturing environment, the first sensor data indicating an initial state of the manufacturing environment;
obtaining second sensor data from the one or more sensors deployed in the manufacturing environment, the second sensor data indicating a current state of the manufacturing environment;
storing the first sensor data in an initial state data structure;
revising estimates of production metrics based upon the second sensor data;
translating an optimization model to a mixed integer program;
solving the mixed integer program;
translating, using an optimizer, a solution to the mixed integer program using the optimization model to generate an optimized schedule for operators of a manufacturing environment based on an optimization data structure, the optimization data structure comprising one or more manufacturing objectives and one or more resource constraints;
simulating, using a simulator, manufacturing activity based on the generated optimized schedule, the revised estimates of production metrics, and the initial state data structure;
storing simulation results in a simulation data structure; and
analyzing the simulation results in the simulation data structure to determine a satisfaction of the manufacturing objectives.

20. The non-transitory machine-readable storage medium of claim 19, further comprising instructions that, when executed by the one or more processors of the machine, cause the machine to perform operations comprising repeating the generating, simulating, storing, and analyzing operations based on one or more revised manufacturing objectives.

* * * * *